(12) United States Patent
Xu et al.

(10) Patent No.: US 10,643,393 B2
(45) Date of Patent: May 5, 2020

(54) METHOD, ELECTRONIC DEVICE, AND STORAGE MEDIUM FOR INFORMATION PROCESSING

(71) Applicant: LENOVO (BEIJING) CO., LTD., Beijing (CN)

(72) Inventors: Lin Xu, Beijing (CN); Xu Zhao, Beijing (CN)

(73) Assignee: LENOVO (BEIJING) CO., LTD, Beijing (CN)

( * ) Notice: Subject to any disclaimer, the term of this patent is extended or adjusted under 35 U.S.C. 154(b) by 0 days.

(21) Appl. No.: 16/021,924

(22) Filed: Jun. 28, 2018

(65) Prior Publication Data

US 2019/0005730 A1    Jan. 3, 2019

(30) Foreign Application Priority Data

Jun. 29, 2017    (CN) .......................... 2017 1 0514506

(51) Int. Cl.
| | |
|---|---|
| *G06T 3/00* | (2006.01) |
| *G06T 19/00* | (2011.01) |
| *G06F 3/0482* | (2013.01) |
| *G06F 3/01* | (2006.01) |
| *G06F 3/0481* | (2013.01) |

(52) U.S. Cl.
CPC ............ *G06T 19/006* (2013.01); *G06F 3/011* (2013.01); *G06F 3/012* (2013.01); *G06F 3/0482* (2013.01); *G06F 3/04815* (2013.01)

(58) Field of Classification Search
None
See application file for complete search history.

(56) References Cited

U.S. PATENT DOCUMENTS

2017/0092002 A1*    3/2017    Mullins ................... G06F 3/013

FOREIGN PATENT DOCUMENTS

| CN | 104598037 A | 5/2015 |
|---|---|---|
| CN | 105912589 A | 8/2016 |

* cited by examiner

*Primary Examiner* — Nurun N Flora
(74) *Attorney, Agent, or Firm* — Anova Law Group, PLLC (57) ABSTRACT

A method for information processing includes displaying a display object at a first display location in a first space area of a physical scene; detecting a first user-related event; and in response to the first user-related event satisfying a preset condition, performing a display operation in connection to the display object with respect to a second space area of the physical scene.

18 Claims, 10 Drawing Sheets

METHOD, ELECTRONIC DEVICE, AND STORAGE MEDIUM FOR INFORMATION PROCESSING

CROSS-REFERENCES TO RELATED APPLICATIONS

This application claims priority to Chinese Patent Application No. 201710514506.8, filed Jun. 29, 2017, which is incorporated herein by reference in its entirety.

TECHNICAL FIELD

The present disclosure generally relates to the field of the electronic technology, and in particular, to method, electronic device and storage medium for information processing.

BACKGROUND

Augmented reality (AR) technology realizes seamless integration of real-world information and virtual-world information. AR is a technology for augmenting the user's sensory experience of the real-world through computer-generated perceptual information. The virtual information is applied to the real world, and the computer-generated, virtual object, scene, or the system prompted information is overlaid on a real scene to augment the reality. In other words, AR is a brand new human-computer interaction technology using cameras, sensors, real-time calculations, and matching technologies to overlay a real environment with a virtual object in a same picture or space in real time, so that the real environment and the virtual object coexist in the same picture or space at the same time.

Users can have immersive mixed reality experiences of the objective physical world through the virtual reality system. Users can also break through the limitation of space, time, and other objective limitations to experience what cannot be experienced in the real world.

Currently, most of virtual display information in AR device is fixed based on objects or space. In other words, the virtual display information is location based service (LBS). The problem is that the user may open different virtual display information at a different location. As time goes on, a large amount of virtual display information may be opened and a long distance of the movement may occur. It is then difficult to acquire the information again that is fixed with a previous location. In this case, the user needs to go through pieces of information one by one in the space, which is time consuming and laborious with low efficiency.

The disclosed devices and methods are directed to at least partially alleviate one or more problems set forth above and to solve other problems in the art.

SUMMARY

One aspect of the present disclosure provides a method for information processing. The method for information processing includes displaying a display object at a first display location in a first space area of a physical scene; detecting a first user-related event; and in response to the first user-related event satisfying a preset condition, performing a display operation in connection to the display object with respect to a second space area of the physical scene.

Another aspect of the present disclosure provides an electronic device includes a display and a processor coupled to the display. The processor is configured to instruct the display to display a display object at a first display location in a first space area of a physical scene; detect a first user-related event; and in response to the first user-related event satisfying a preset condition, instruct the display to perform a display operation in connection to the display object with respect to a second space area of the physical scene.

Another aspect of the present disclosure provides a non-transitory computer-readable storage medium having computer-executable program instructions stored. When being executed, the computer-executable program instructions cause a processor to perform a method for information processing. The method for information processing includes displaying a display object at a first display location in a first space area of a physical scene; detecting a first user-related event; and in response to the first user-related event satisfying a preset condition, performing a display operation in connection to the display object with respect to a second space area of the physical scene.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to various embodiments of the present disclosure, which are illustrated in the accompanying drawings. Wherever possible, the same reference numbers will be used throughout the drawings to refer to the same or like parts.

Various embodiments of the present disclosure provide a method for information processing, which may be applied to an electronic device. The functions of the disclosed method for information processing may be realized by a processor in the electronic device to call program codes. The program codes can be stored in a computer-readable storage medium. The electronic device includes a least a processor and a storage medium.

Figure 1:
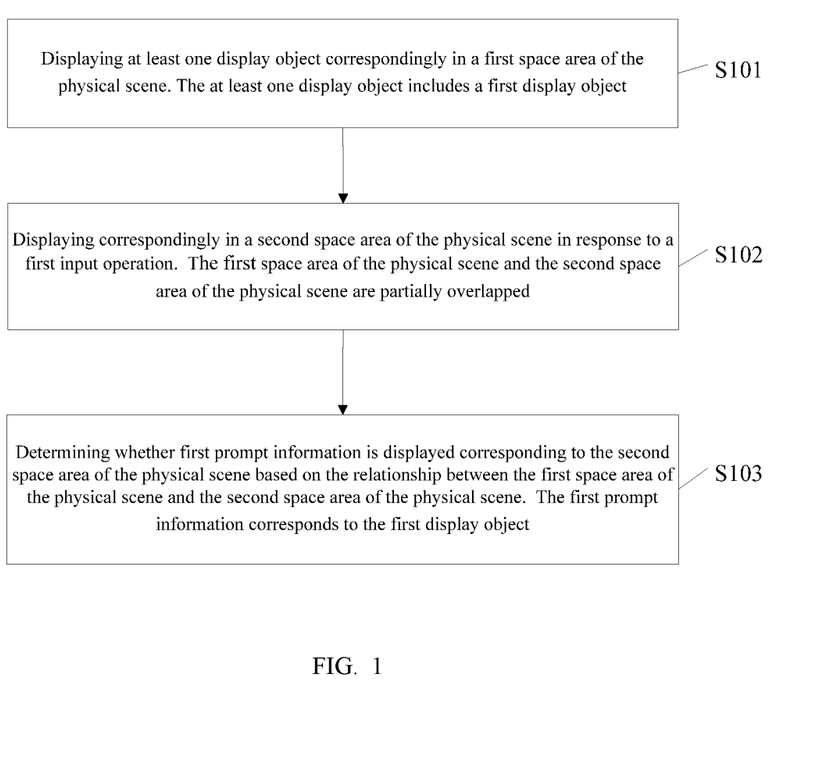
FIG. 1 is a schematic flow chart of a method for information processing according to some embodiments of the present disclosure.

FIG. 1 is a schematic flow chart of a method for information processing according to some embodiments of the present disclosure. As shown in FIG. 1, the method for information processing includes the following.

In S101: displaying a first display object at a first display location in a first space area of a physical scene.

As disclosed, the display object includes virtual display information. The space area includes a physical scene or a physical environment. The display object refers to a location based service for displaying the virtual display information to a user.

Figure 2:
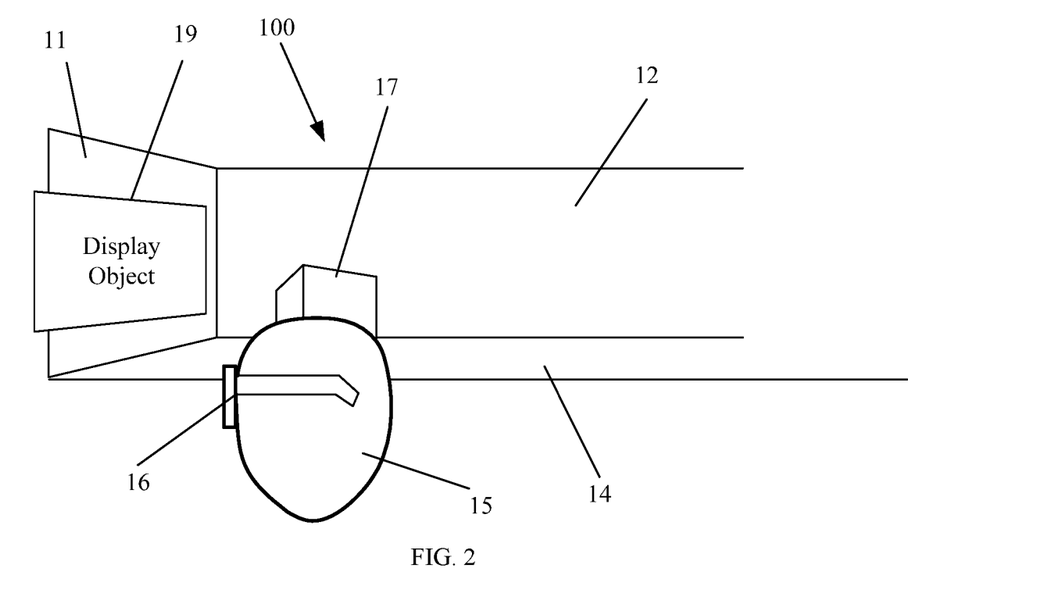
FIG. 2 is a schematic diagram of a scenario including an augmented reality (AR) device in a physical scene according to some embodiments of the present disclosure.

In one example as shown in FIG. 2, a user 15 wears an AR device 16, and sees a physical scene. The physical scene includes a first wall 11 and a second wall 12, and a ground 14. A real object 17 is arranged on the ground 14. When the user 15 is in a first location/posture (i.e., location and posture), for example, the user 15 is facing the first wall 11, the user 15 sees the displayed or opened display object 19.

Figure 3:
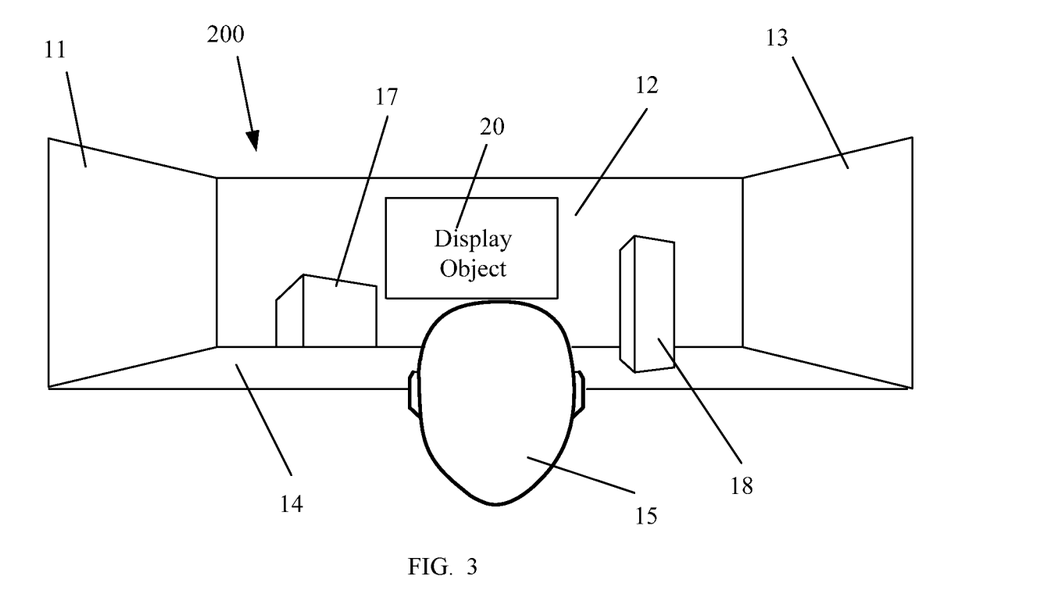
FIG. 3 is a schematic diagram of a scenario including an AR device in a physical scene according to some embodiments of the present disclosure.

In another example as shown in FIG. 3, when the user 15 is in a second location/posture, the physical scene seen by the user 15 includes the first wall 11, the second wall 12, a third wall 13, and the ground 14. The two objects 17 and 18 are arranged on the ground 14. When the user 15 is in the second location/posture, for example, the user 15 is facing the second wall 12, the user 15 sees the displayed or opened display object 20.

Figure 5:
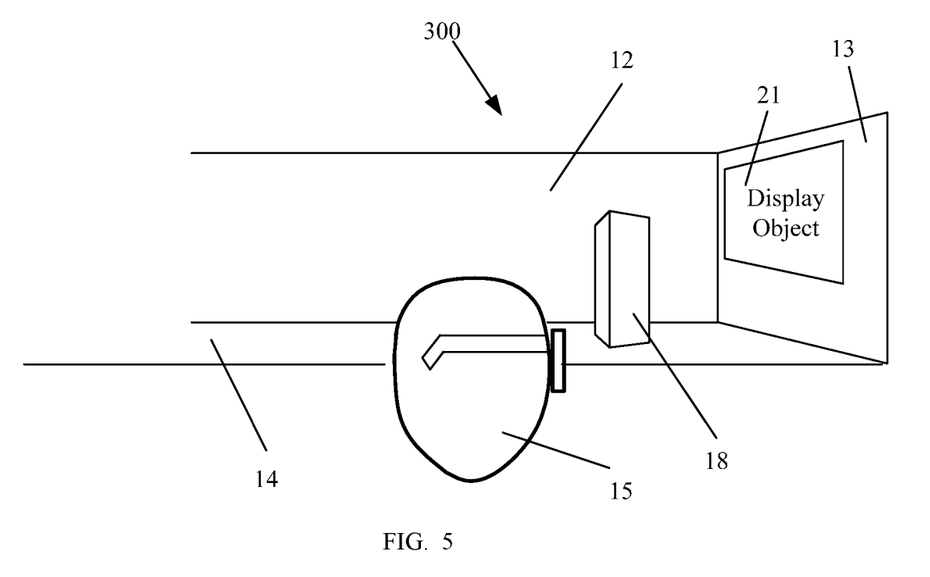
FIG. 5 is a schematic diagram of a scenario including an AR device in a physical scene according to some embodiments of the present disclosure.

In another example as shown in FIG. 5, when the user 15 is in a third location/posture, the physical scene seen by the user 15 includes the second wall 12 and the third wall 13, and a ground 14. The object 18 is arranged on the ground 14. When the user 15 is in the third location/posture, for example, the user 15 is facing the third wall 13, the user sees a display object 21.

Therefore, when the user is in different locations/postures, different display objects can be displayed or opened or seen, and the display objects are based on the service of the location.

In S102: detecting a first user-related event and performing a display correspondingly in a second space area of a physical scene in response to detecting the first user-related event. The first space area of the physical scene and the second space area of the physical scene are partially overlapped. It should be appreciated that a plurality of space areas are comprised in the physical scene, and typically, the one or more display objects are displayed in the corresponding space area of the physical scene that at least overlaps with the user's field of view (FOV).

In some embodiments, the first user-related event is related to the type of the AR device. When the AR device only includes glasses, the first user-related event can be a head-moving operation, for example, operations of head turning, head shaking, looking up, and looking down. Of course, the AR device can also include a remote control, and the remote control can control the movement of forward, backward, leftward, rightward, upward, downward, and other moving operations.

For example, FIG. 2 shows the user in the first location/posture with respect to the first space area 100 of the physical scene. FIG. 3 shows the user in the second location/posture with respect to the second space area 200 of the physical scene. When the user is in different locations/postures, the space areas seen by the user are not exactly the same. FIGS. 2 and 3 show the space areas with respect to part or all of the space area shown in FIG. 4. The space area in FIG. 4 includes the first wall 11, the second wall 12, a third wall 13, and the ground 14. The two objects 17 and 18 are on the ground 14. The first space area of the physical scene shown in FIG. 2 is a part of the space area shown in FIG. 4, and the second space area of the physical scene shown in FIG. 3 is the same as the space area shown in FIG. 4.

In S103: determining whether first prompt information is displayed with respect to the second space area of the physical scene based on the relationship between the first space area of the physical scene and the second space area of the physical scene. The first prompt information corresponds to the first display object.

In some embodiments, a first display object is displayed to a first space area of the physical scene correspondingly. In response to the first user-related event, display is carried out correspondingly in the second space area of the physical scene. Whether the first prompt information is displayed with respect to the second space area of the physical scene may be determined based on the relationship between the first space area of the physical scene and the second space area of the physical scene. The first prompt information corresponds to the first display object. Thus, when the space area changes, the previous opened virtual display object may be prompted in the next space area so that the user can choose whether to display the previous displayed object or not. In this way, the user can easily obtain the previous displayed object. As such, the user does not need to look up the display objects one by one in the space, and user's experience is improved.

In some embodiments, a display operation in connection to the first display object with respect to the second space area is performed when the first user-related event satisfies a preset condition. The preset condition can be, for example, a separation distance between the first space area and the second space area exceeds a predetermined threshold distance. The display operation can include, for example, displaying the first display object at a second display location in the second space area or generating and outputting the first prompt information.

Figure 8:
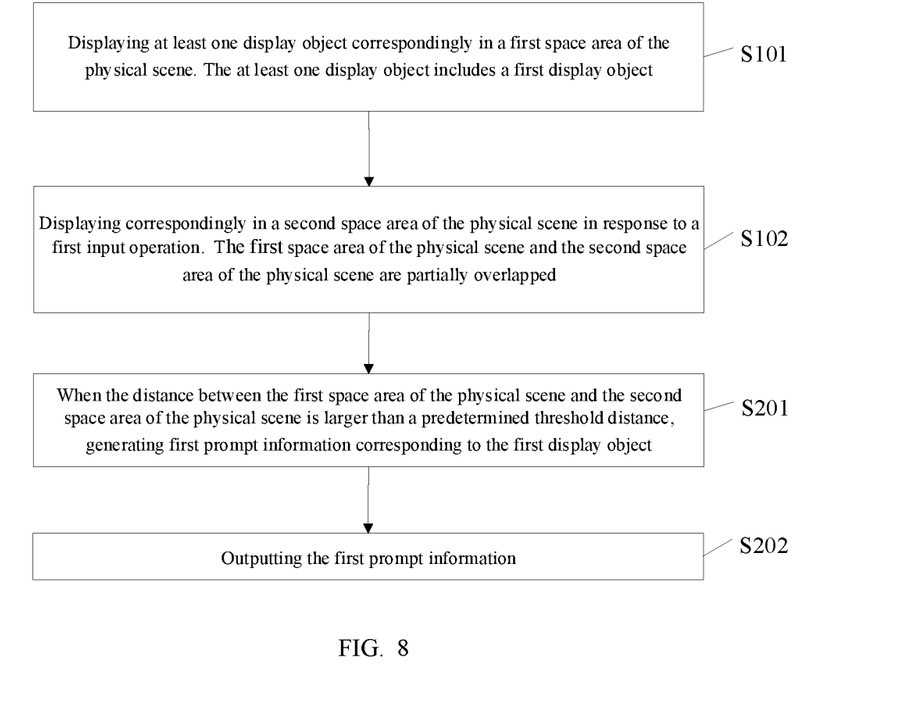
FIGS. 8-12 are schematic flow charts of methods for information processing according to some embodiments of the present disclosure.

In this manner, the disclosed method for information processing, as shown in FIG. 8, may include the following.

In S101: displaying at least one display object correspondingly in a first space area of the physical scene. The at least one display object includes a first display object.

In S102: displaying correspondingly in a second space area of the physical scene in response to a first user-related event. The first space area of the physical scene and the second space area of the physical scene are partially overlapped.

In some embodiments, the first user-related event is related to the type of the AR device. When the AR device only includes glasses, the first user-related event can be a head-moving operation, for example, operations of head rotating, head shaking, head lifting, and head dropping. The AR device can also include remote control, and the remote control can control the movement of forward, backward, leftward, rightward, upward, downward, and other moving operations.

For example, FIG. 2 shows the user in the first location/posture with respect to the first space area of the physical scene. FIG. 3 shows the user in the second location/posture with respect to the second space area of the physical scene. When the user is in different locations/postures, the space areas seen by the user are not exactly the same. FIGS. 2 and 3 show the space areas with respect to part or all of the space area shown in FIG. 4. The space area includes the first wall 11, the second wall 12, a third wall 13, and the ground 14. The two objects 17 and 18 are arranged on the ground 14. The first space area of the physical scene shown in FIG. 2 is part of the space area shown in FIG. 4, and the second space area of the physical scene shown in FIG. 3 is the same as the space area shown in FIG. 4.

In S201: when the distance between the first space area of the physical scene and the second space area of the physical scene is larger than a predetermined threshold distance, generating first prompt information with respect to the first display object.

In some embodiments, in the implementation process, the distance between the first space area of the physical scene and the second space area of the physical scene can be calculated using references to the coordinate points.

For example, a first relative reference coordinate point or line in the first space area of the physical scene and a second relative reference coordinate point or line in the second space area of the physical scene may be determined. The distance between the first relative reference coordinate point and the second relative reference coordinate point is determined as the distance between the first space area of the physical scene and the second space area of the physical scene. Alternatively, the distance between the first relative reference coordinate line and the second relative reference coordinate line can be determined as the distance between the first space area of the physical scene and the second space area of the physical scene. For example, a center point in the first space area of the physical scene is determined as the first relative reference coordinate point, and a central point in the second space area of the physical scene is determined as the second relative reference coordinate point. For example, the line at the end of the user's vision scope in the first space area of the physical scene is determined as the first relative reference coordinate line, a line at the end of the user's vision scope in the second space area of the physical scene is determined as a second relative reference coordinate line. For example, an intersection point between the first relative reference coordinate line and the horizontal line can be determined as a first relative reference coordinate point, and an intersection point between the second relative reference coordinate line and the horizontal line can be determined as the second relative reference coordinate point.

In S202: outputting the first prompt information.

As such, for determining whether the first prompt information is displayed with respect to the second space area based on the relationship between the first and second space areas as described in S103 by performing S201 and S202.

Conventionally, a user may have an option to move the window to another location, or the movement may follow the user, which requires the user's pre-judgment and pre-setting in advance. Most of the time, the user could not find the needed information. Due to the immersive experience of AR, the user may ignore the relative offset of distance between the information and the user in the AR-using process. According to the embodiments of the present disclosure, when the distance between the user and the information exceeds a certain threshold, through the self-judgment of the system or the parameters given by the user in advance, the prompt information pops up so that the user can be reminded to perform corresponding operations on the information box. The corresponding operation on the information box can be, for example, following, transferring, etc. Thus, the use of electronic device can reduce the cost of the user's self-judgment by examining the distance. Meanwhile, the user can be reminded actively after the virtual information (display object) moves out for a certain distance, so that the memory cost of the user can be reduced.

Figure 9:
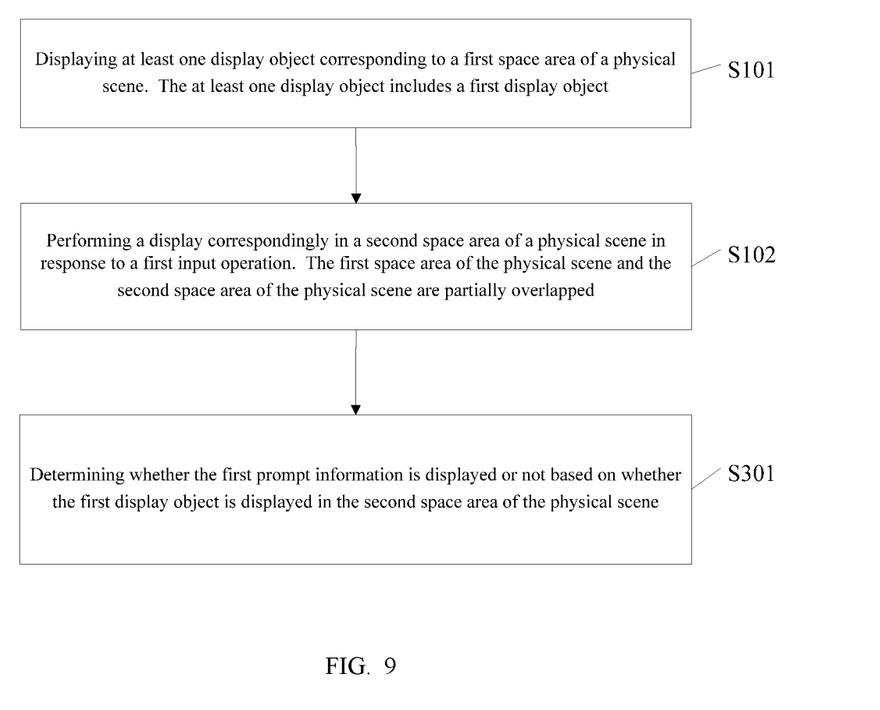

In this manner, the disclosed method for information processing, as shown in FIG. 9, may include the following.

In S101: displaying at least one display object correspondingly in a first space area of the physical scene, and the at least one display object includes a first display object.

In S102: displaying correspondingly in a second space area of the physical scene in response to a first user-related event. The first space area of the physical scene and the second space area of the physical scene are partially overlapped.

In S301: determining whether the first prompt information is displayed or not based on whether the first display object is displayed in the second space area of the physical scene.

As such, the method for performing S103 is described in S301.

In some embodiments, S301 includes the following. When the first display object is not in the second space area of the physical scene, determine that the first prompt information is displayed in the second space area of the physical scene and output the first prompt information. When the first display object is in the second space area of the physical scene, determine that the first prompt information is not displayed in the second space area of the physical scene. As shown in FIG. 3, a display object 19 as the first display object is in the second space area of the physical scene, the first prompt information does not need to be displayed. As shown in FIG. 5, a display object 19 as the first display object is in a third space area 300, the first prompt information needs to be displayed. The display object 20 as the first display object is in the third space area, the first prompt information is required to be displayed. The first prompt information corresponds to the display object 20.

In another embodiment, the S301 can also be replaced with the following. Whether the first prompt information is displayed or not is determined based on the judgment on whether the first space area of the physical scene is displayed in the second space area of the physical scene or not. When the first space area of the physical scene is in the second space area of the physical scene, determine that the first prompt information is not displayed in the second space area of the physical scene. When the first space area of the physical scene is not in the second space area of the physical scene, determine that the first prompt information is displayed in the second space area of the physical scene and output the first prompt information. As shown in FIG. 3, the first space area of the physical scene is in the second space area of the physical scene, so that the first prompt information does not need to be displayed. As shown in FIG. 5, the first space area of the physical scene is in the third space area, first prompt information needs to be displayed. The second space area of the physical scene is in the third space area, so that the second prompt information does not need to be displayed.

Figure 10:
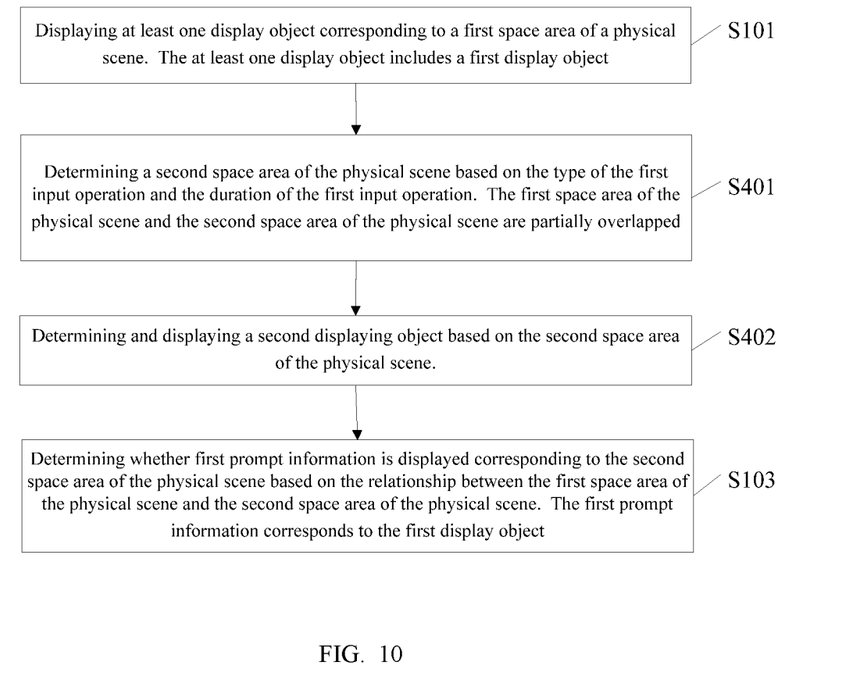

In this manner, the disclosed method for information processing, as shown in FIG. 10, may include the following.

In S101: displaying at least one display object correspondingly in a first space area of the physical scene, and the at least one display object includes a first display object.

In S401: determining a second space area of the physical scene based on the type of the first user-related event and the duration of the first user-related event. The first space area of the physical scene and the second space area of the physical scene are partially overlapped.

As above discussed, the first user-related event is related to the type of the AR device. When the AR device only includes glasses, the first user-related event can be a head-moving operation, for example, operations of head rotating, head shaking, head lifting, and head dropping. The AR device can also include a remote control, and the remote control can control the movement of forward, backward, leftward, rightward, upward, downward, and other moving operations. When the first user-related event is a head-moving operation, the type of the first user-related event includes operations of head rotating, head shaking, head lifting, and head dropping. When the first user-related event is a control user-related event, the type of the first user-related event includes forward, backward, leftward, rightward, upward, downward, and other moving operations. The duration and the moving distance are proportional to each other. When the duration is longer, the moving distance is bigger, while when the duration is shorter, the moving distance is smaller.

In the implementation process, association information can be preset, and the association information is used for indicating the corresponding relation between the type and the duration of the user-related event and the space area. The association information can be realized in the implementation process by adopting a mapping relation.

In S402: determining and displaying a second display object based on the second space area of the physical scene.

The above discussed S401 and S402 provide a method for implementing S102 by performing a display correspondingly in the second space area of the physical scene in response to the first user-related event in the preceding embodiment.

In S103: determining whether first prompt information is displayed with respect to the second space area of the physical scene based on the relationship between the first space area of the physical scene and the second space area of the physical scene. The first prompt information corresponds to the first display object.

In another embodiment, based on the relationship between the first space area of the physical scene and the second space area of the physical scene, whether the first prompt information is displayed with respect to the second space area of the physical scene or not is determined. The determination process includes: when the distance between the first space area of the physical scene and the second space area of the physical scene is larger than a predetermined threshold distance, generating the first prompt information with respect to the first display object; and outputting the first prompt information.

In another embodiment, based on the relationship between the first space area of the physical scene and the second space area of the physical scene, whether the first prompt information is displayed with respect to the second space area of the physical scene or not is determined. The determination process includes: determining whether to display the first prompt information by judging whether the first display object is displayed in the second space area of the physical scene.

Figure 11:
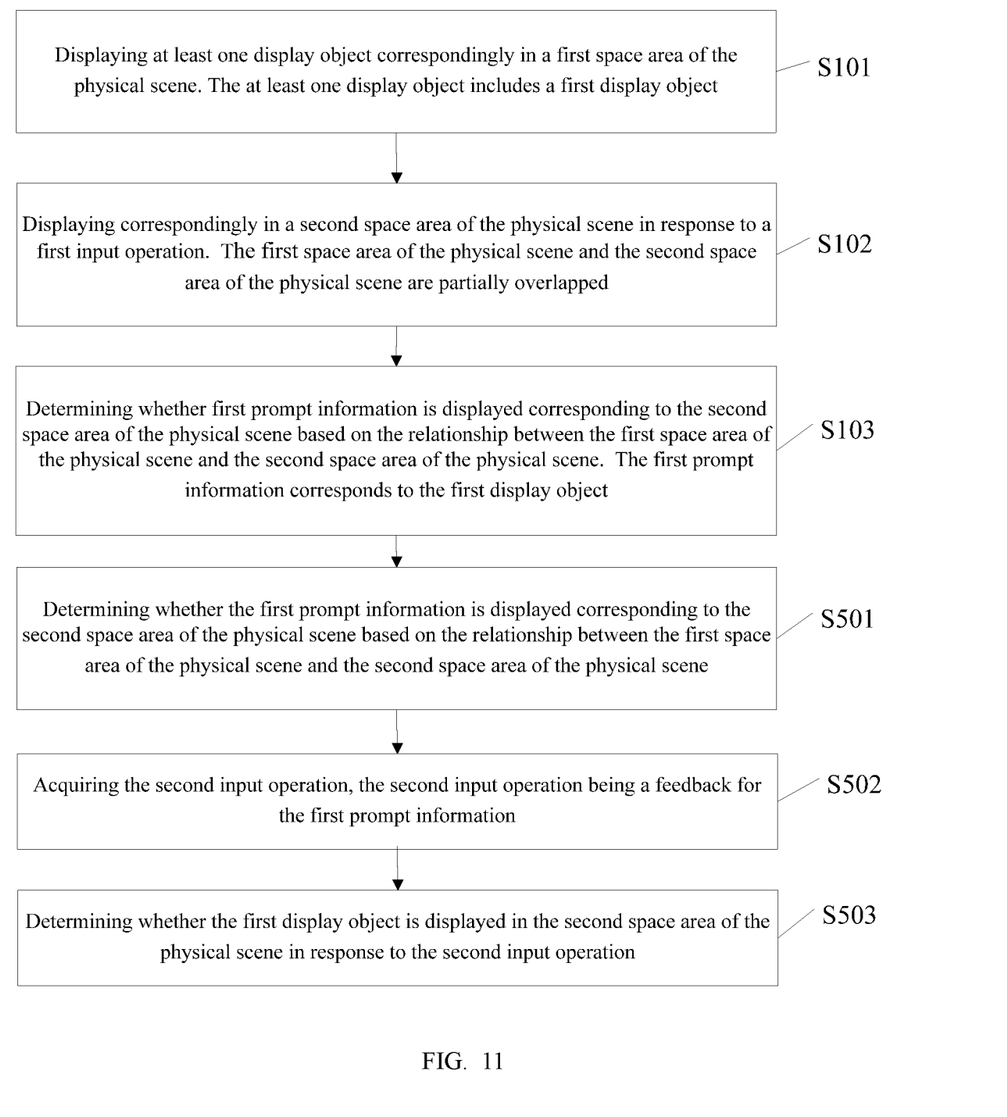

In this manner, the disclosed method for information processing, as shown in FIG. 11, may include the following.

In S101: displaying at least one display object correspondingly in a first space area of the physical scene, and the at least one display object includes a first display object.

In S102: displaying correspondingly in a second space area of the physical scene in response to a first user-related event. The first space area of the physical scene and the second space area of the physical scene are partially overlapped.

In S103: determining whether the first prompt information is displayed with respect to the second space area of the physical scene based on the relationship between the first space area of the physical scene and the second space area of the physical scene. The first prompt information corresponds to the first display object.

In S501: determining whether the first prompt information is displayed with respect to the second space area of the physical scene based on the relationship between the first space area of the physical scene and the second space area of the physical scene.

In S502: acquiring the second user-related event, the second user-related event being a feedback for the first prompt information.

Figure 6:
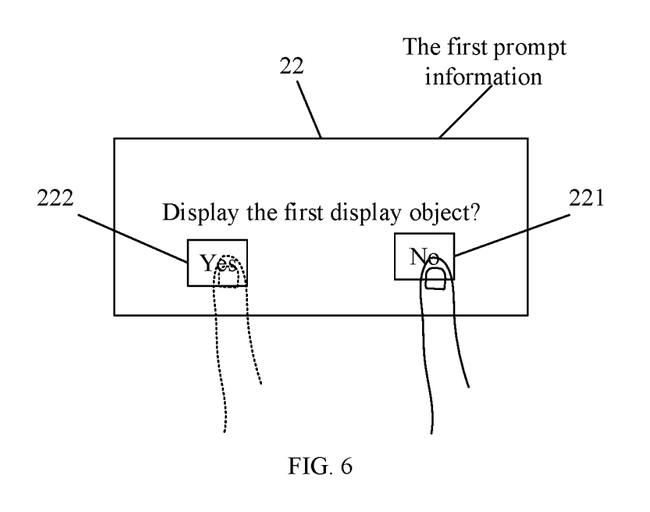
FIG. 6 is a schematic diagram of an example of a display interface of an AR device according to some embodiments of the present disclosure.

For example, as shown in FIG. 6, the content of the first prompt information displayed on the display interface of the device includes whether to display the first display object. Further, there are two touch areas 221 and 222 under the first display object for the user to select. When the user selects "yes" 222, the first display object is displayed, e.g., at a second display location in the second space area. When the user selects "no" 221, the first display object is not displayed. Correspondingly, the second user-related event is an operation of selecting "no" 221 or "yes" 222 for the user.

In S503: determining whether the first display object is displayed in the second space area of the physical scene in response to the second user-related event.

In some embodiments, the second user-related event includes an operation that may include whether to select a first display object. When the second user-related event is selecting the operation for displaying the first display object, the first display object is displayed. When the second user-related event is selecting the operation for not displaying the first display object, the first display object is not displayed.

In another embodiment, based on the relationship between the first space area of the physical scene and the second space area of the physical scene, whether the first prompt information is displayed with respect to the second space area of the physical scene or not is determined. The determination process includes: when the distance between the first space area of the physical scene and the second space area of the physical scene is larger than a predetermined threshold distance, generating the first prompt information with respect to the first display object; and outputting the first prompt information.

In another embodiment, based on the relationship between the first space area of the physical scene and the second space area of the physical scene, whether the first prompt information is displayed with respect to the second space area of the physical scene or not is determined. The determination process includes: determining whether to display the first prompt information by judging whether the first display object is displayed in the second space area of the physical scene.

In another embodiment, in response to the first user-related event, the performed display correspondingly in the second space area of the physical scene includes: determining the second space area of the physical scene based on the type and duration of the first user-related event; and determining and displaying a second display object based on the second space area of the physical scene.

Figure 12:
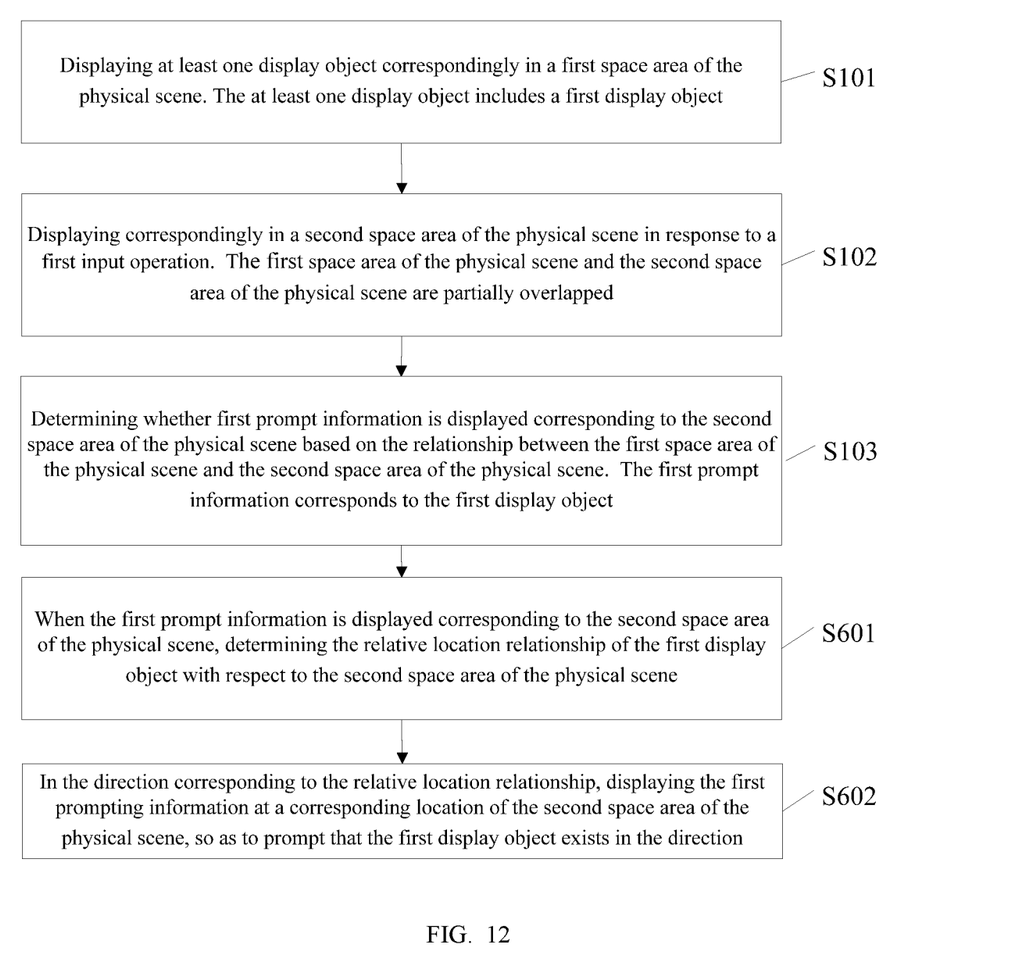

In this manner, the disclosed method for information processing, as shown in FIG. 12, may include the following.

In S101: displaying at least one display object correspondingly in a first space area of the physical scene, and the at least one display object includes a first display object.

In S102: displaying correspondingly in a second space area of the physical scene in response to a first user-related event. The first space area of the physical scene and the second space area of the physical scene are partially overlapped.

In S103: determining whether the first prompt information is displayed with respect to the second space area of the physical scene based on the relationship between the first space area of the physical scene and the second space area of the physical scene. The first prompt information corresponds to the first display object.

In S601: when the first prompt information is displayed with respect to the second space area of the physical scene, determining the relative location relationship of the first display object with respect to the second space area of the physical scene.

In S602: in the direction corresponding to the relative location relationship, displaying the first prompt information at a corresponding location of the second space area of the physical scene, so as to prompt that the first display object exists in the direction.

Figure 4:
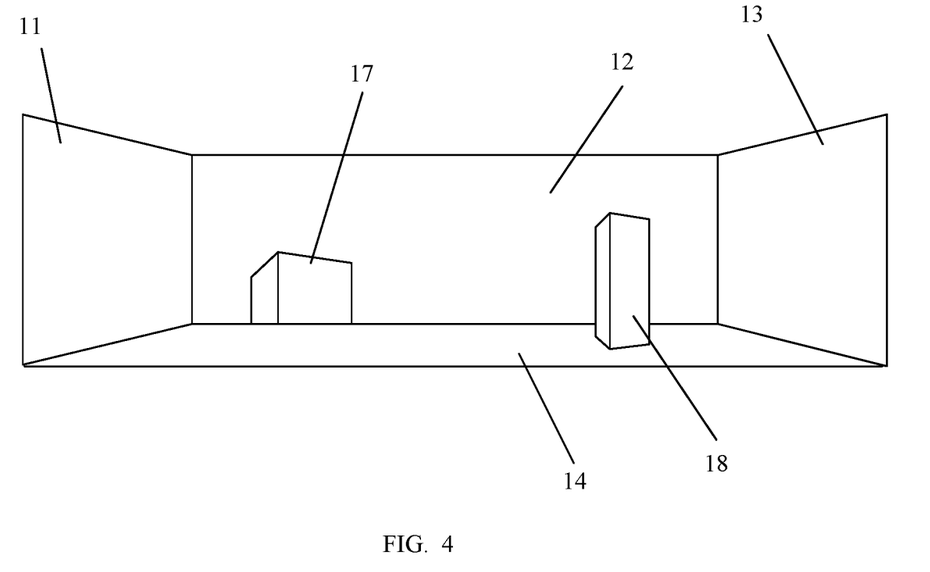
FIG. 4 is a schematic diagram of a scenario including an AR device in a physical scene according to some embodiments of the present disclosure.
Figure 7:
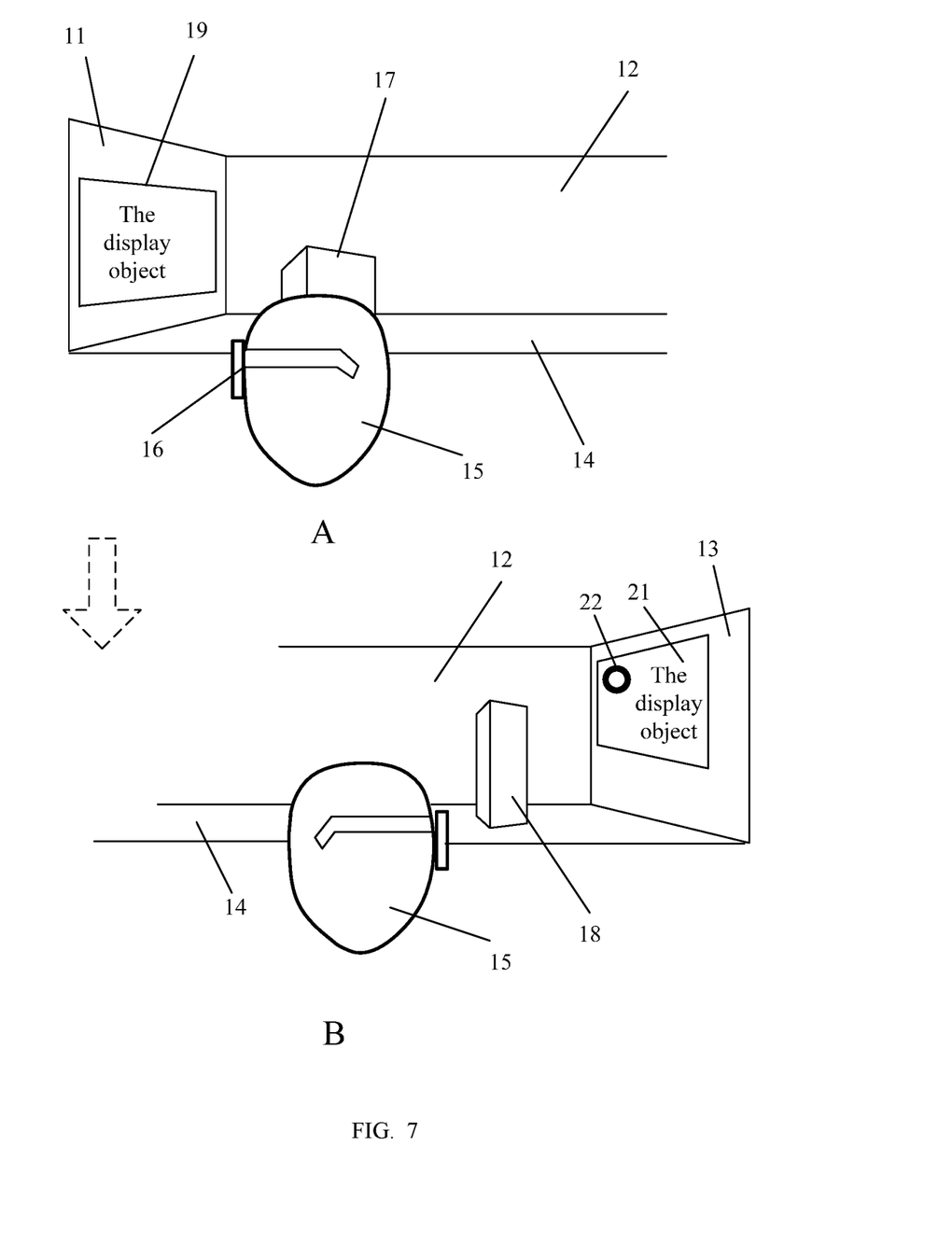
FIG. 7 is a schematic diagram of a scenario including an AR device in a physical scene according to some embodiments of the present disclosure.

Part A of FIG. 7 shows a partial space area of the left side in FIG. 4. Part B of FIG. 7 shows a partial space area of the right side in FIG. 4. The display object in part A of FIG. 7 is the first display object, and the space area in part B of FIG. 7 is the second space area of the physical scene. Assuming that the content to be displayed on the small circle 22 is "whether display the first display object", due to the fact that the first display object is on the left side (relative location relationship) of the second space area of the physical scene, the small circle is displayed on the left side of the second space area of the physical scene. In another embodiment, when the first display object is on the right side, the upper side, the lower side, etc., of the second space area of the physical scene (relative location relationship), the small circle is displayed on the right side, the upper side, the lower side, etc., of the second space area of the physical scene, respectively. The corresponding relation may help the user to recall the space orientation of the first display object better.

In another embodiment, when the electronic device selects to display the first prompt information, a form of a prompt box or a prompt point can be used. As shown in FIG. 6, the first prompt information 22 is embodied in the form of a small circle 22 in the third display object. When the user sees the small circle, it indicates that there is prompt information at present. When the user clicks the small circle 22, the content of the prompt information is popped up as shown in FIG. 6. When the user does not click the small circle 22, the small circle can disappear after a period of time, or be continuously displayed.

In another embodiment, based on the relationship between the first space area of the physical scene and the second space area of the physical scene, whether the first prompt information is displayed with respect to the second space area of the physical scene or not is determined. The determination process includes: when the distance between the first space area of the physical scene and the second space area of the physical scene is larger than a predetermined threshold distance, generating the first prompt information with respect to the first display object; and outputting the first prompt information.

In another embodiment, based on the relationship between the first space area of the physical scene and the second space area of the physical scene, whether the first prompt information is displayed with respect to the second space area of the physical scene or not is determined. The determination process includes: determining whether to display the first prompt information by judging whether the first display object is displayed in the second space area of the physical scene.

In another embodiment, in response to the first user-related event, the performed display correspondingly in the second space area of the physical scene includes: determining the second space area of the physical scene based on the type and duration of the first user-related event; and determining and displaying a second display object based on the second space area of the physical scene.

In another embodiment, the first prompt information is used for prompting the user whether to display the first display object in the second space area of the physical scene. The method further includes: determining whether the first prompt information is displayed with respect to the second space area of the physical scene based on the relationship between the first space area of the physical scene and the second space area of the physical scene; acquiring the second user-related event, the second user-related event being a feedback for the first prompt information; and determining whether the first display object is displayed in the second space area of the physical scene in response to the second user-related event.

Based on the previous discussed embodiments, the embodiments of the present disclosure provide an electronic device. The electronic device includes a display, an input device, a memory, a processor and a computer program which is stored on the memory and can be executed by the processor. For the processor to execute the program, the following are realized.

The display with respect to the first space area of the physical scene is controlled to display at least one display object, and the at least one display object includes a first display object.

A first user-related event based is obtained on the input device and is displayed correspondingly in the second space area of the physical scene. The first space area of the physical scene and the second space area of the physical scene are partially overlapped.

Whether first prompt information is displayed with respect to second space area of the physical scene is determined based on the relationship between the first space area of the physical scene and the second space area of the physical scene. The first prompt information corresponds to the first display object.

In another embodiment, based on the relationship between the first space area of the physical scene and the second space area of the physical scene, determining whether the first prompt information is displayed or not correspondingly in the second space area of the physical scene includes: when the distance between the first space area of the physical scene and the second space area of the physical scene is larger than a predetermined threshold distance, generating the first prompt information with respect to the first display object; and outputting the first prompt information.

In another embodiment, determining whether first prompt information is displayed with respect to the second space area of the physical scene based on the relationship between the first space area of the physical scene and the second space area of the physical scene includes: determining whether the first prompt information is displayed or not by judging whether the first display object is displayed in the second space area of the physical scene.

In another embodiment, performing a display correspondingly in a second space area of the physical scene in response to a first user-related event includes: determining a second space area of the physical scene based on the type of the first user-related event and the duration of the first user-related event; and determining and displaying a second display object based on the second space area of the physical scene.

In another embodiment, the first prompt information is used for prompting the user whether to display the first display object in the second space area of the physical scene or not. The processor 304 executes the program to implement the following: acquiring the second user-related event, the second user-related event being a feedback for the first prompt information; determining whether the first display object is displayed in the second space area of the physical scene in response to the second user-related event.

In another embodiment, the processor 304 executes the program to implement the following: when the first prompt information is displayed with respect to the second space area of the physical scene, determining the relative location relationship of the first display object with respect to the second space area of the physical scene; and in the direction corresponding to the relative location relationship, displaying the first prompt information at a corresponding location of the second space area of the physical scene, so as to prompt that the first display object exists in the direction.

In various embodiments, the disclosed devices may be described similarly and/or have similar beneficial effects as for the disclosed methods. Some technical details for the disclosed devices may not be described in great detail but may be understood by referring to those described for the disclosed methods.

The embodiments of the present disclosure further provide a device for information processing. The device for information processing includes a first display, a second display and a determination unit.

The first display is used for displaying at least one display object correspondingly in the first space area of the physical scene, and the at least one display object includes a first display object.

The second display is used for performing a display correspondingly in the second space area of the physical scene in response to the first user-related event. The first space area of the physical scene and the second space area of the physical scene are partially overlapped.

The determining unit is used for determining whether first prompt information is displayed with respect to the second space area of the physical scene based on the relationship between the first space area of the physical scene and the second space area of the physical scene. The first prompt information corresponds to the first display object.

In various embodiments, the disclosed devices may be described similarly and/or have similar beneficial effects as for the disclosed methods. Some technical details for the disclosed devices may not be described in great detail but may be understood by referring to those described for the disclosed methods.

In the embodiments of the present disclosure, when the method for information processing is implemented in the form of a software function unit and is sold or used as an independent product, it can be stored in a computer readable storage medium. The technical scheme of the embodiments of the present disclosure intrinsically or the portion which makes contributions to the prior art can be embodied in the form of a software product. The computer software product is stored in a storage medium, and instructions are used for enabling one computer device (a personal computer, a server, or a network device, etc.) to execute all or part of the method disclosed by the embodiments of the present disclosure. The storage medium includes a USB flash disk, a removable hard disk, a read only memory (ROM), a magnetic disk, an optical disk, and other media capable of storing program codes. Thus, the embodiments of the present disclosure are not limited to any specific hardware and software combination.

The embodiments of the present disclosure provide a computer readable storage medium, and a computer program is stored on the computer readable storage medium. The computer program is executed by the processor to realize the steps of the method for information processing.

It should be understood that "one embodiment" or "the embodiment" is referred to specific features, structures or characteristics which are related to some embodiments and included in at least one embodiment of the present disclosure. Thus, throughout the whole specification, "in one embodiment" or "in the embodiment" is not necessarily referring to the same embodiment. In addition, the specific features, the structures or the characteristics can be combined in any suitable manner in one or more embodiments. It is appreciated that, in various embodiments of the present disclosure, the sequence number of each process does not mean the process to be executed sequentially. The execution sequence of each process should be determined according to the function and the internal logic of the process. The implementation process of the embodiments of the present disclosure does not need to be limited by the sequence numbers. The sequence numbers of the embodiments of the present disclosure are only for description purpose, and do not represent advantages or the disadvantages of the embodiments.

It should be noted that the term "included", "comprising", or any other variation thereof are intended to encompass a non-exclusive inclusion. Thus, a process, a method, an article, or a device including a series of elements, not only include those elements but also include other elements not explicitly listed, or further include the inherent elements of the process, the method, the article, or the device. In case of no more restrictions, the statement "include one . . . " does not exclude the process, the method, the article, or the device including those elements from further having other same elements.

It is appreciated that in several embodiments provided by the present disclosure, the disclosed device and method can be realized in other manners. The device embodiments described above are merely illustrative. For example, the dividing of the unit is only for logic function purpose, and in actual implementation, other dividing mode can be used. For example, multiple units or components can be combined or be integrated into another system, or some features can be ignored or not executed. In addition, the coupling, the direct coupling, or the communication connection between the components which have been displayed or discussed may be through the direct coupling or communication connection between some interfaces, devices, or units. The coupling or connection may be electrical, mechanical, or etc.

The units described as separate units may or may not be physically separated. The component as a display may be or may not be a physical unit. It can be located in one place, but also can be distributed to a plurality of network units. All or some of the units can be selected according to actual needs to achieve the purpose of the scheme of the embodiment.

In addition, all function units in the embodiments of the present disclosure can be integrated in one processing unit. Each unit can also be independently used as a unit, and two or more than two units can also be integrated in one unit. The integrated unit can be implemented in the form of hardware, and can also be implemented in the form of function unit of hardware plus software.

Person of ordinary skill in the art would understand that all or part of the steps of the method embodiments can be realized through a hardware which is related to program instructions. The program can be stored in a computer readable storage medium. When the program is executed, the steps of the method embodiments are executed. The storage medium includes: a mobile storage device, a ROM, a magnetic disk, an optical disk, etc., which can be used for storing program codes.

Alternatively, when the integrated unit disclosed by the present disclosure is embodied in the form of software function module and be sold or used as an independent product, it can also be stored in a computer readable storage medium. Based on such understanding, the technical scheme of the embodiments of the present disclosure intrinsically or the portion which makes contributions to the prior art can be embodied in the form of a software product. The computer software product is stored in a storage medium, and instructions are used for enabling one computer device (a personal computer, a server, or a network device, etc.) to execute all or part of the method disclosed by the embodiments of the present disclosure. The storage medium includes a USB flash disk, a removable hard disk, a read only memory (ROM), a magnetic disk, an optical disk, and other media capable of storing program codes.

The above descriptions are only specific embodiments of the present disclosure, and the protection scope of the present disclosure is not limited thereto. Those of ordinary skill in the art can easily figure out modification or replacement, and the modification and change should be covered within the protection scope of the present disclosure. Therefore, the protection scope of the present disclosure is subject to the protection scope of the claims.

What is claimed is:

1. A method for information processing, comprising:
   displaying a display object at a first display location in a first space area of a physical scene;
   detecting a first user-related event;
   determining a second space area of the physical scene based on a type of the first user-related event and a duration of the first user-related event, the first space area of the physical scene and the second space area of the physical scene being partially overlapped or being separated by a separation distance; and
   in response to the first user-related event satisfying a preset condition, performing a display operation in connection to the display object with respect to the second space area of the physical scene.

2. The method according to claim 1, wherein the first space area and the second space area are separated by the separation distance and the preset condition comprises:
   the separation distance between the first space area of the physical scene and the second space area of the physical scene exceeds a predetermined threshold distance.

3. The method according to claim 2, wherein in response to the first user-related event satisfying the preset condition, performing the display operation in connection to the display object with respect to the second space area of the physical scene includes:
   responsive to the separation distance between the first space area of the physical scene and the second space area of the physical scene as determined exceeding the predetermined threshold distance:
      displaying the display object at a second display location in the second space area.

4. The method according to claim 2, wherein in response to the first user-related event satisfying the preset condition, performing the display operation in connection to the display object with respect to the second space area of the physical scene includes:
   responsive to the separation distance between the first space area of the physical scene and the second space area of the physical scene as determined exceeding the predetermined threshold distance:
      generating prompt information, the prompt information prompting whether to display the display object at a second display location in the second space area of the physical scene; and
      outputting the prompt information.

5. The method according to claim 4, further comprising:
   acquiring a second user-related event, the second user-related event being a feedback in response to the prompt information; and
   displaying the display object at the second display location in the second space area of the physical scene in response to the second user-related event.

6. The method according to claim 4, wherein in response to the first user-related event satisfying the preset condition, performing the display operation in connection to the display object with respect to the second space area of the physical scene further includes:
   responsive to the prompt information being generated:
      determining a relative location relationship of the display object with respect to the second space area of the physical scene; and
      in a direction corresponding to the relative location relationship, displaying the prompt information at a corresponding location of the second space area of the physical scene, to indicate that the display object exists in the direction.

7. An electronic device, comprising
   a display; and
   a processor coupled to the display, wherein the processor is configured to:
      instruct the display to display a display object at a first display location in a first space area of a physical scene;
      detect a first user-related event;
      determine a second space area of the physical scene based on a type of the first user-related event and a duration of the first user-related event, the first space area of the physical scene and the second space area of the physical scene being partially overlapped or being separated by a separation distance; and
      in response to the first user-related event satisfying a preset condition, instruct the display to perform a display operation in connection to the display object with respect to a second space area of the physical scene.

8. The electronic device according to claim 7, wherein the first space area and the second space area are separated by the separation distance and the preset condition comprises:
   the separation distance between the first space area of the physical scene and the second space area of the physical scene exceeds a predetermined threshold distance.

9. The electronic device according to claim 8, wherein the processor is further configured to:
   responsive to the separation distance between the first space area of the physical scene and the second space area of the physical scene as determined exceeding the predetermined threshold distance:
   instruct the display to display the display object at a second display location in the second space area.
10. The electronic device according to claim 8, wherein the processor is further configured to:
   generate a prompt information, the prompt information prompting whether to display the display object at a second display location in the second space area of the physical scene; and
   outputs the prompt information to the display.
11. The electronic device according to claim 10, wherein the processor is further configured to:
   acquire a second user-related event, the second user-related event being a feedback in response to the prompt information; and
   instruct the display to display the display object at the second display location in the second space area of the physical scene in response to the second user-related event.
12. The electronic device according to claim 10, wherein the processor is further configured to:
   responsive to the prompt information being generated:
      determine a relative location relationship of the display object with respect to the second space area of the physical scene; and
      in a direction corresponding to the relative location relationship, displaying the prompt information at a corresponding location of the second space area of the physical scene, to indicate that the display object exists in the direction.
13. A non-transitory computer-readable storage medium, having computer-executable program instructions stored thereon, wherein when being executed, the computer-executable program instructions cause a processor to perform a method for information processing, the method comprising:
   displaying a display object at a first display location in a first space area of a physical scene;
   detecting a first user-related event;
   determine a second space area of the physical scene based on a type of the first user-related event and a duration of the first user-related event, the first space area of the physical scene and the second space area of the physical scene being partially overlapped or being separated by a separation distance; and
   in response to the first user-related event satisfying a preset condition, performing a display operation in connection to the display object with respect to a second space area of the physical scene.
14. The storage medium according to claim 13, wherein the first space area and the second space area are separated by the separation distance and the preset condition comprises:
   the separation distance between the first space area of the physical scene and the second space area of the physical scene exceeds a predetermined threshold distance.
15. The storage medium according to claim 14, wherein in response to the first user-related event satisfying the preset condition, performing the display operation in connection to the display object with respect to the second space area of the physical scene includes:
   responsive to the separation distance between the first space area of the physical scene and the second space area of the physical scene as determined exceeding the predetermined threshold distance:
      displaying the display object at a second display location in the second space area.
16. The storage medium according to claim 14, wherein in response to the first user-related event satisfying the preset condition, performing the display operation in connection to the display object with respect to the second space area of the physical scene includes:
   responsive to the separation distance between the first space area of the physical scene and the second space area of the physical scene as determined exceeding the predetermined threshold distance:
      generating prompt information, the prompt information prompting whether to display the display object at a second display location in the second space area of the physical scene; and
      outputting the prompt information.
17. The storage medium according to claim 16, wherein the method further comprises:
   acquiring a second user-related event, the second user-related event being a feedback in response to the prompt information; and
   displaying the display object at the second display location in the second space area of the physical scene in response to the second user-related event.
18. The storage medium according to claim 16, wherein in response to the first user-related event satisfying the preset condition, performing the display operation in connection to the display object with respect to the second space area of the physical scene further includes:
   responsive to the prompt information being generated:
      determining a relative location relationship of the display object with respect to the second space area of the physical scene; and
      in a direction corresponding to the relative location relationship, displaying the prompt information at a corresponding location of the second space area of the physical scene, to indicate that the display object exists in the direction.

* * * * *